US012679416B2

(12) United States Patent
Kim

(10) Patent No.: US 12,679,416 B2
(45) Date of Patent: Jul. 14, 2026

(54) METHOD FOR DRIVING CONTROL BASED ON BOARDING CONGESTION AND A VEHICLE USING THE SAME

(71) Applicants: HYUNDAI MOTOR COMPANY, Seoul (KR); KIA CORPORATION, Seoul (KR)

(72) Inventor: Jung Wan Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 197 days.

(21) Appl. No.: 18/520,051

(22) Filed: Nov. 27, 2023

(65) Prior Publication Data

US 2024/0367682 A1      Nov. 7, 2024

(30) Foreign Application Priority Data

May 3, 2023      (KR) ........................ 10-2023-0057505

(51) Int. Cl.
*B60W 60/00*          (2020.01)
*B60W 30/14*          (2006.01)
(Continued)

(52) U.S. Cl.
CPC ...... *B60W 60/0016* (2020.02); *B60W 30/143* (2013.01); *B60W 40/08* (2013.01);
(Continued)

(58) Field of Classification Search
CPC .......... B60W 60/0016; B60W 30/143; B60W 40/08; B60W 60/0013; B60W 60/00253; B60W 2040/0881; B60W 2420/403; B60W 2540/049; B60W 2540/227; B60W 2720/10; B60W 2720/106; B60W 30/18009; B60W 50/0098; B60W 60/0015; B60W 2540/01; B60W 10/04; B60W 10/18; B60W 10/20; B60W 40/13; B60W 2540/223; B60W 2720/12; G06V 20/593; G06V 40/10
See application file for complete search history.

(56) References Cited

U.S. PATENT DOCUMENTS

2017/0057316 A1* 3/2017 Northrop ............... G01G 19/42
2019/0332112 A1* 10/2019 Wei ..................... B60W 30/025

FOREIGN PATENT DOCUMENTS

CN        110473399 A  * 11/2019  ............... G08G 1/01
EP        2712780 B1  *  4/2018  ......... G08G 1/09623
JP        2017186945 A  * 10/2017

OTHER PUBLICATIONS

Machine translation of CN-110473399-A (Year: 2019).*
Machine translation of JP-2017186945-A (Year: 2017).*

* cited by examiner

*Primary Examiner* — Navid Z. Mehdizadeh
*Assistant Examiner* — Caitlin R Mccleary
(74) *Attorney, Agent, or Firm* — Lempia Summerfield Katz LLC

(57) ABSTRACT

A method for driving control based on boarding congestion and a vehicle using the same include generating congestion information based on passenger number information of a vehicle, constructing driving limit information based on the congestion information and driving state information, and setting driving control information applied to operate the vehicle based on the driving limit information.

14 Claims, 10 Drawing Sheets

(51) Int. Cl.
    *B60W 40/08*        (2012.01)
    *G06V 20/59*        (2022.01)
    *G06V 40/10*        (2022.01)
(52) U.S. Cl.
    CPC .. *B60W 60/0013* (2020.02); *B60W 60/00253*
            (2020.02); *G06V 20/593* (2022.01); *G06V
        *40/10* (2022.01); *B60W 2040/0881* (2013.01);
            *B60W 2420/403* (2013.01); *B60W 2540/049*
                (2020.02); *B60W 2540/227* (2020.02)

(a) DECELERATION (b) ACCELERATION (a) DECELERATION (b) ACCELERATION (a) DECELERATION (b) ACCELERATION

METHOD FOR DRIVING CONTROL BASED ON BOARDING CONGESTION AND A VEHICLE USING THE SAME

CROSS-REFERENCE TO RELATED APPLICATION

This application claims priority to and the benefit of Korean Patent Application No. 2023-0057505, filed on May 3, 2023, the disclosure of which is incorporated herein by reference in its entirety.

BACKGROUND

Technical Field

The present disclosure relates to a driving control method and a vehicle using the same, and more particularly, to a driving control method based on boarding congestion for minimizing the disturbance of a driving motion endangering passengers and securing stable ride comfort and safety and relates to a vehicle using the same.

Description of the Related Art

Means of transportation may be provided as vehicles in various sizes according to the number of people expected to board the vehicle. For example, vehicles that a lot of people board may be a small shuttle, a bus, a subway train, and the like. A multi-passenger vehicle may be produced to enable every passenger to sit in a seat or to provide standing room for allowing passengers to stand together with seats in a boarding space in order that the vehicle can carry more passengers.

Passengers boarding a vehicle with standing room and seats may be exposed to many dangerous driving situations of the vehicle. For example, when the vehicle has a driving motion accompanied by a sudden disturbance or change, the standing passengers may stagger or fall down as the driving motion causes a tilt of the vehicle or the passengers. Herein, the driving motion may be a sudden acceleration, a sudden deceleration, a sharp turn, or the like. When a congestion level is very high due to many standing passengers, passengers may feel riding discomfort attributable to excessive body contact with other passengers caused by the driving motion. Furthermore, as a lot of passengers are excessively moved sideways, a resulting pressure may cause discomfort, injuries, or accidents for the passengers.

A multi-passenger vehicle is typically completely controlled by a driver, but recently, an autonomous driving service is sometimes provided. The driver may control driving through a gentle acceleration/deceleration or a gentle turn on a path in consideration of the number of boarding people. However, autonomous driving is implemented with the exclusion of or minimized intervention of the driver. Accordingly, if a driving plan is established on a path that is set only based on a mere external environment and vehicle conditions without consideration of the boarding situation of passengers, an autonomous driving vehicle may implement a driving operation that might endanger the passengers even when the passengers are densely boarded. Specifically, in a usual situation in which there are only boarded passengers sitting in seats, no further driving method needs to be provided. However, when the number of standing passengers increases, a sudden change in vehicle motion on the path should be prevented or minimized for the purpose of safety. Accordingly, as the increase in congestion level limits the passengers' reaction range in response to disturbance (acceleration/deceleration/turn), a study on a control method for an autonomous driving vehicle in consideration of boarding congestion is required. SUMMARY The present disclosure is technically directed to providing a driving control method based on boarding congestion for minimizing the disturbance caused by a driving motion endangering densely packed passengers and securing stable ride comfort and safety and directed to a vehicle using the method.

It should be understood that the technical objects to be achieved by the present disclosure are not limited to the aforementioned technical objects. Other technical objects not mentioned herein should be apparent to those having ordinary skill in the art to which the present disclosure pertains from the following description.

According to the present disclosure, a driving control method is based on boarding congestion. The method includes: generating congestion information based on passenger number information of a vehicle; constructing driving limit information based on the congestion information and driving state information; and setting driving control information applied to operation or actuation of the vehicle based on the driving limit information.

According to an embodiment of the present disclosure, in the method, the vehicle may be boarded by sitting or standing passengers. The passenger number information may be generated based on maximum passenger number data among multiple pieces of estimated passenger number data estimating a number of passengers in the vehicle.

According to an embodiment of the present disclosure, in the method, the passenger number data may include: board/ unboard count information indicating a number of passengers boarding the vehicle based on counts of boarding/ unboarding passengers; sitting count information indicating a number of sitting passengers; and image count information indicating a number of boarding passengers identified in an image inside the vehicle.

According to an embodiment of the present disclosure, in the method, the passenger number information may be generated by applying an adjustment factor according to a boarding weight to the maximum passenger number data.

According to an embodiment of the present disclosure, in the method, the congestion information may be generated as a congestion level based on the number of boarding passengers in the passenger number information and a boarded area of the vehicle.

According to an embodiment of the present disclosure, in the method, the vehicle may be controlled using autonomous driving set by driving requirement information. The driving requirement information may include a required velocity and a required velocity change rate expected on a forward path of the vehicle. The driving state information may be a current velocity on the path. Also, the driving limit information may be generated based on the congestion information, the driving requirement information, and the driving state information. The driving limit information may include a message for indicating whether or not a restriction is applied, a permissible velocity, and a permissible velocity change rate. The message may indicate whether or not the permissible velocity and the permissible velocity change rate are set by restricting the driving requirement information by the congestion information.

According to an embodiment of the present disclosure, in the method, the permissible velocity and the permissible velocity change rate may be determined based on a velocity limit and each velocity limit change rate, respectively. The determination may occur when an absolute value of at least one of a driving velocity change rate or a turn velocity change rate, which are predicted based on the driving state information and the driving requirement information, exceeds an absolute value of respective velocity limit change rate defined by the congestion information. Also, the permissible velocity and the permissible velocity change rate may be determined based on the driving requirement information when an absolute value of the driving velocity change rate and an absolute value of the turn velocity change rate are equal to or less than the absolute value of respective velocity limit change rate.

According to an embodiment of the present disclosure, in the method, the respective velocity limit change rate may be a velocity limit change rate of a longitudinal direction and a velocity limit change rate of a transverse direction that are set by the congestion information. Also, the driving velocity change rate and the velocity limit change rate of the longitudinal direction may be velocity rates according to a driving direction of the vehicle. The turn velocity change rate and the velocity limit change rate of the transverse direction may be velocity rates occurring during a turn of the vehicle along a curve of the forward path.

According to an embodiment of the present disclosure, in the method, the driving control information may have a driving operation plan of at least one of driving, braking, or steering for the actuating according to a driving control command including a driving plan related to a set velocity and a set velocity change rate established on a forward path based on the driving limit information.

According to an embodiment of the present disclosure, in the method, the vehicle may be controlled using autonomous driving established by driving requirement information. Also, the driving control command may include a driving plan that the set velocity change rate is applied to driving of the vehicle before entry into the forward path to implement the set velocity change rate on the forward path when the driving plan according to the driving limit information is different from an initial control plan on the forward path according to the driving requirement information.

According to another embodiment of the present disclosure, a vehicle implementing driving control based on boarding congestion is provided. The vehicle includes an actuating unit generating a driving operation, a memory storing at least one instruction for the vehicle, and a processor executing the at least one instruction stored in the memory. The processor is configured to generate congestion information based on passenger number information of the vehicle, construct driving limit information based on the congestion information and driving state information, and set driving control information applied to the actuating unit based on the driving limit information.

The technical problems solved by the present disclosure are not limited to the above technical problems. Other technical problems that are not described herein should be more clearly understood by a person (hereinafter referred to as an ordinary technician) having ordinary skill in the technical field to which the present disclosure belongs from the following description.

BRIEF DESCRIPTION OF THE DRAWINGS

In order that the disclosure may be well understood, various forms and embodiments thereof are now described, given by way of example, reference being made to the accompanying drawings.

4

Figure 1:
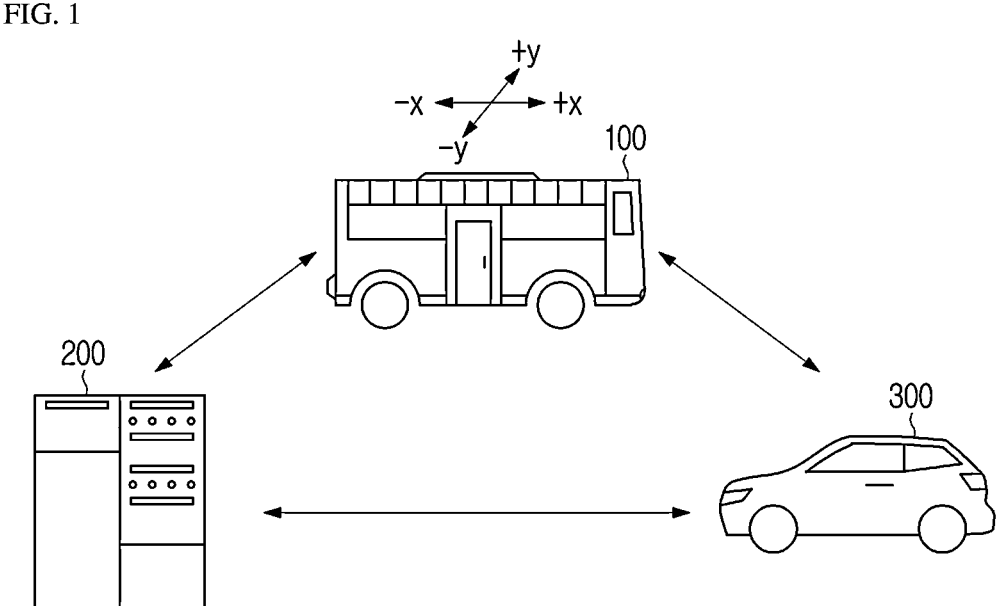

FIG. 1 is a view illustrating a vehicle transmitting and receiving data in communication with another device.

Figure 2:
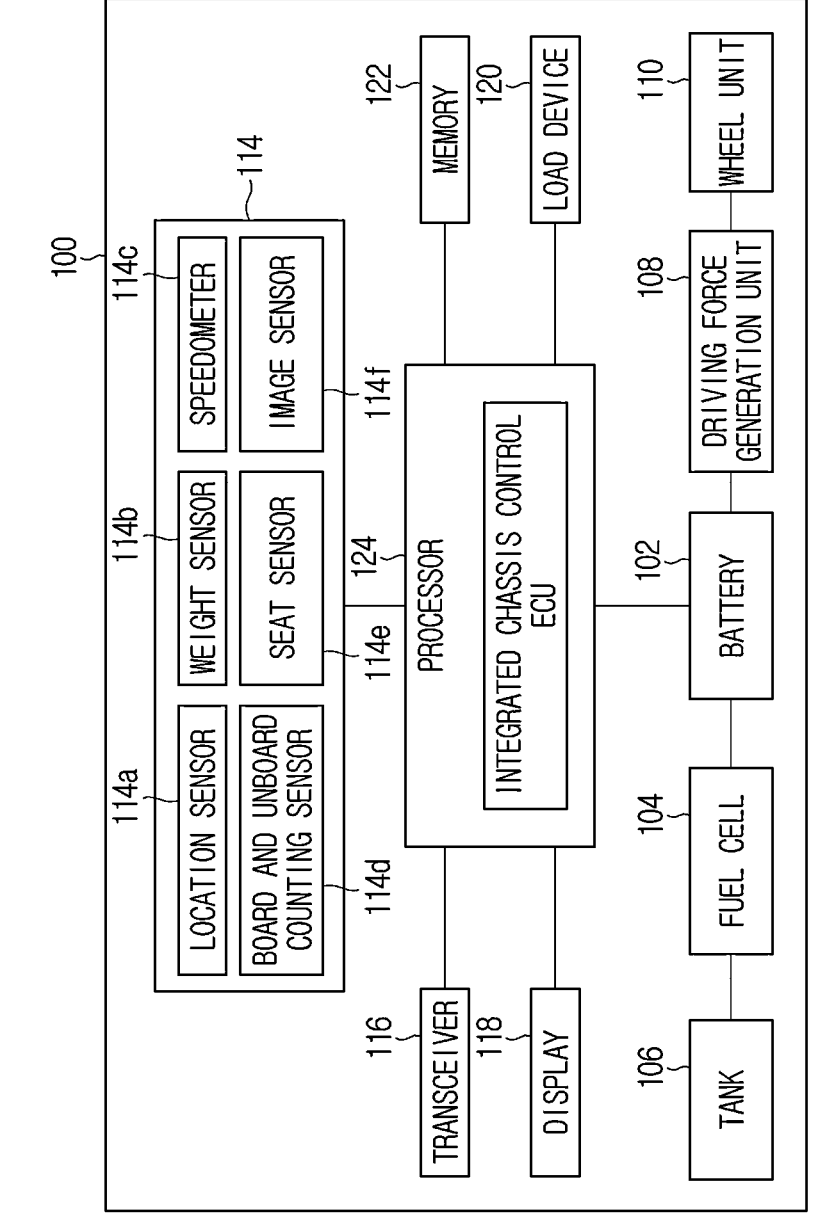

FIG. 2 is a view showing a module constituting a vehicle according to one embodiment of the present disclosure.

Figure 3:
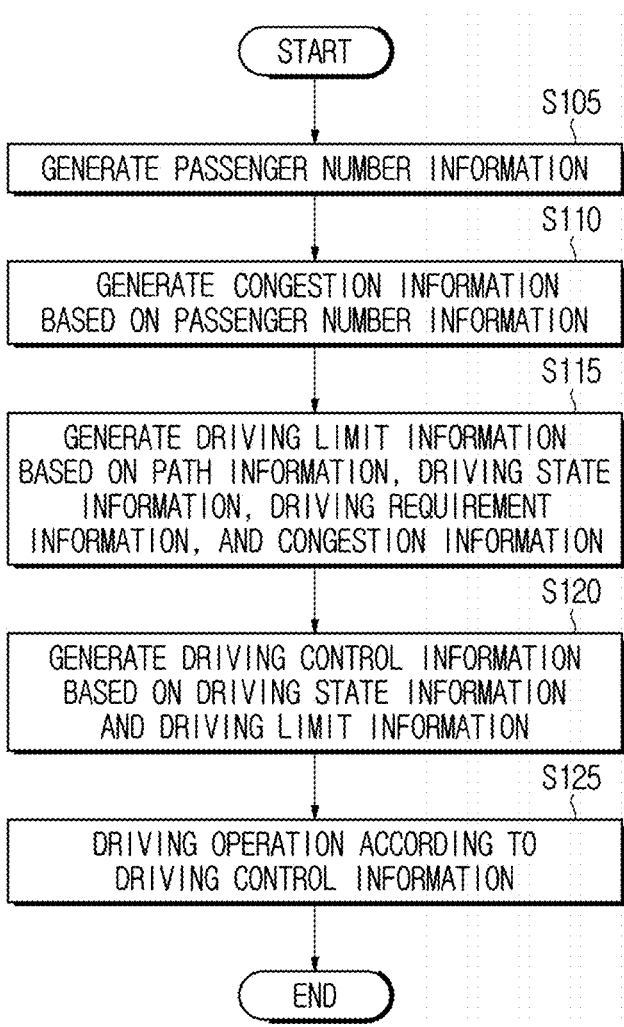

FIG. 3 is a flowchart of a driving control method based on boarding congestion according to another embodiment of the present disclosure.

Figure 4:
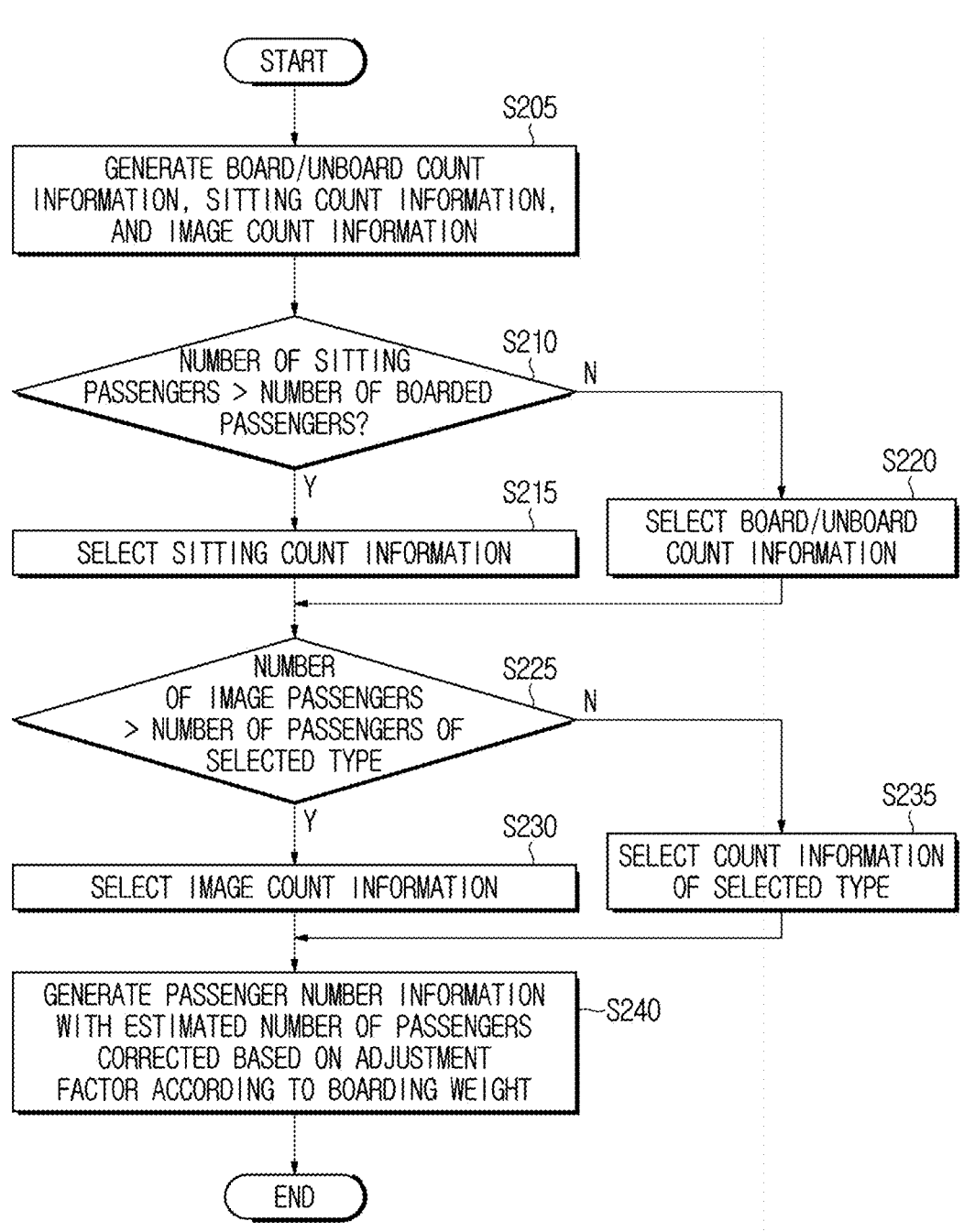

FIG. 4 is a flowchart of a process of generating passenger number information.

Figure 5:
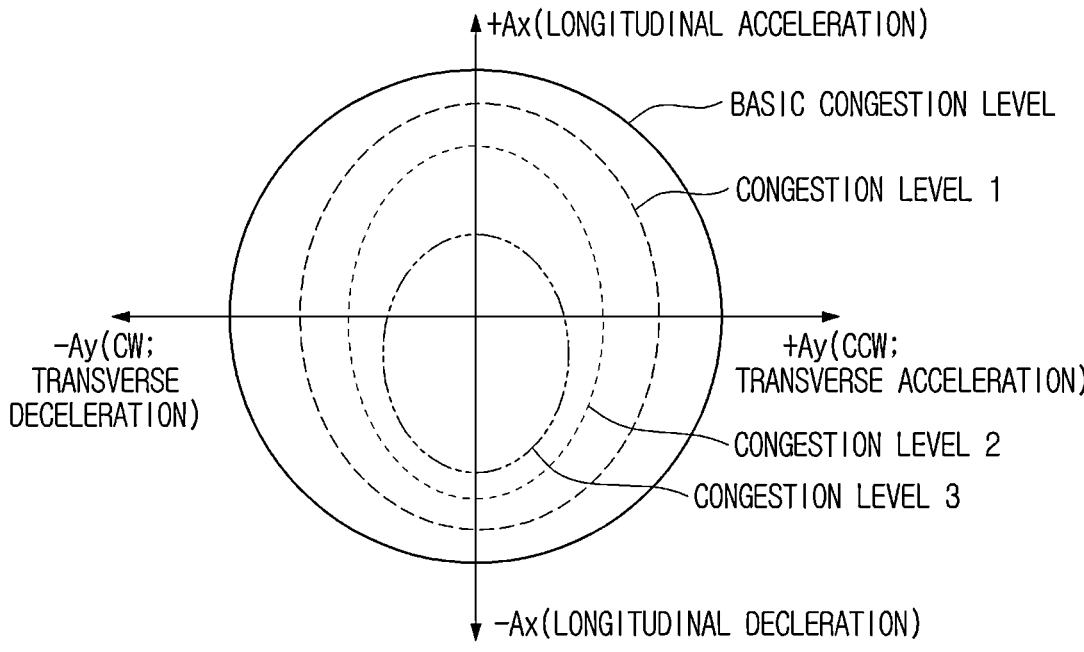

FIG. 5 is a view illustrating limit mapping information of a velocity change rate according to congestion information.

Figure 6:
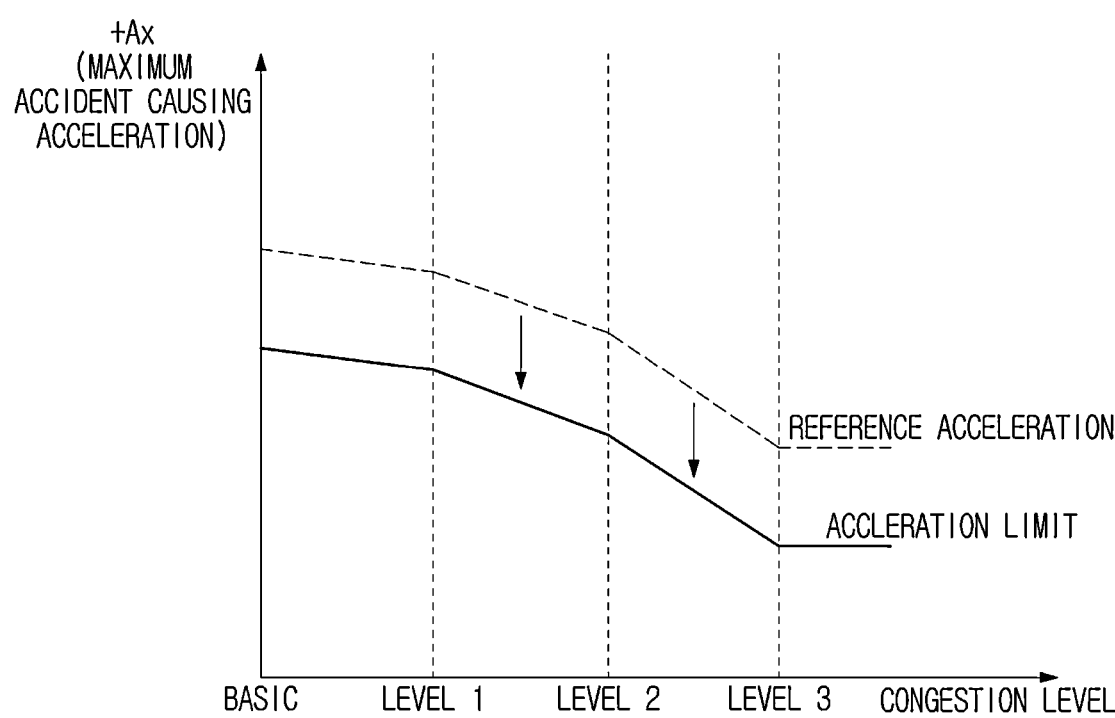

FIG. 6 is a view illustrating a linear graph of a longitudinal velocity change rate generated based on limit mapping information.

Figure 7:
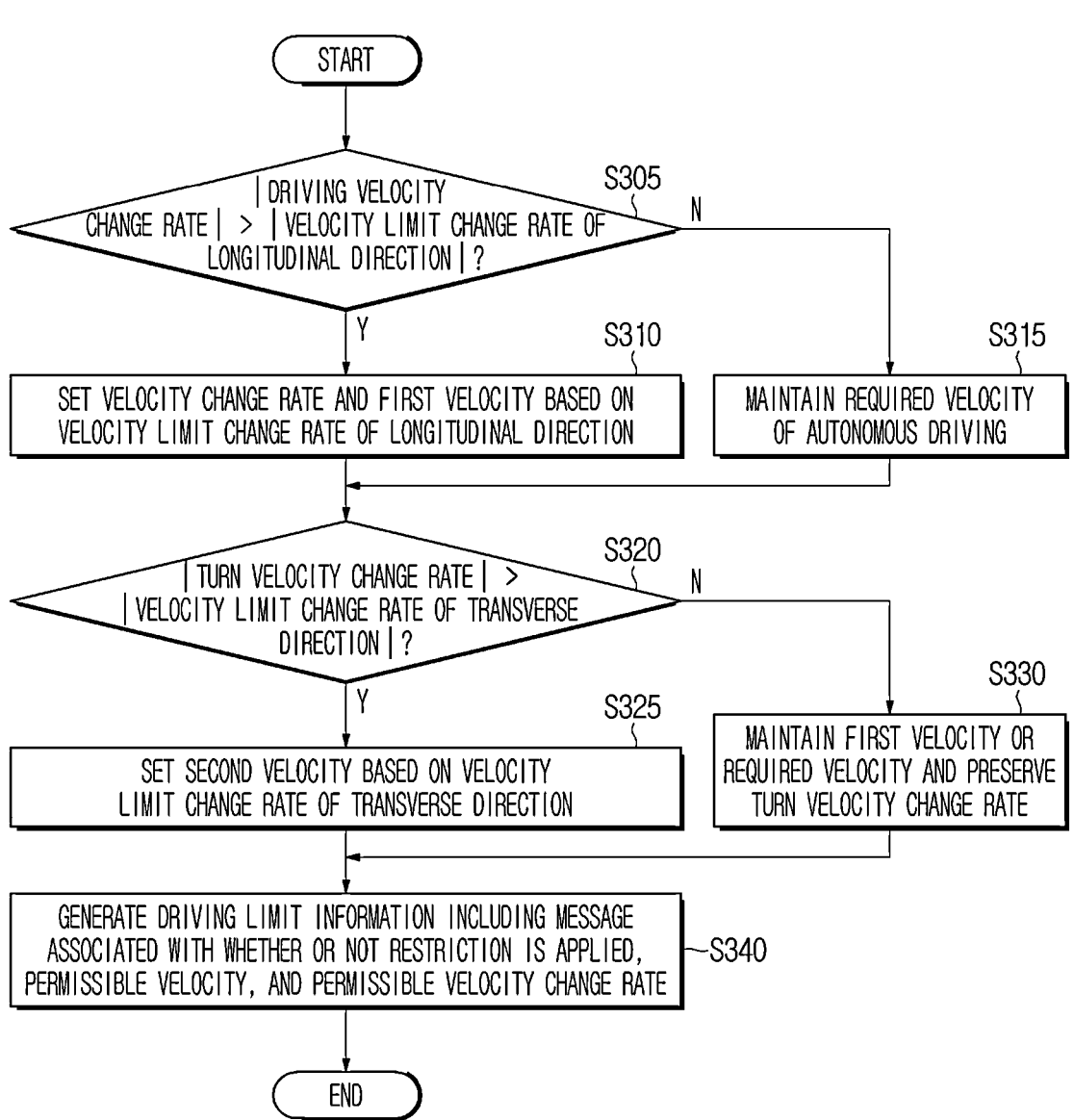

FIG. 7 is a flowchart of a process of constructing driving limit information.

Figure 8:
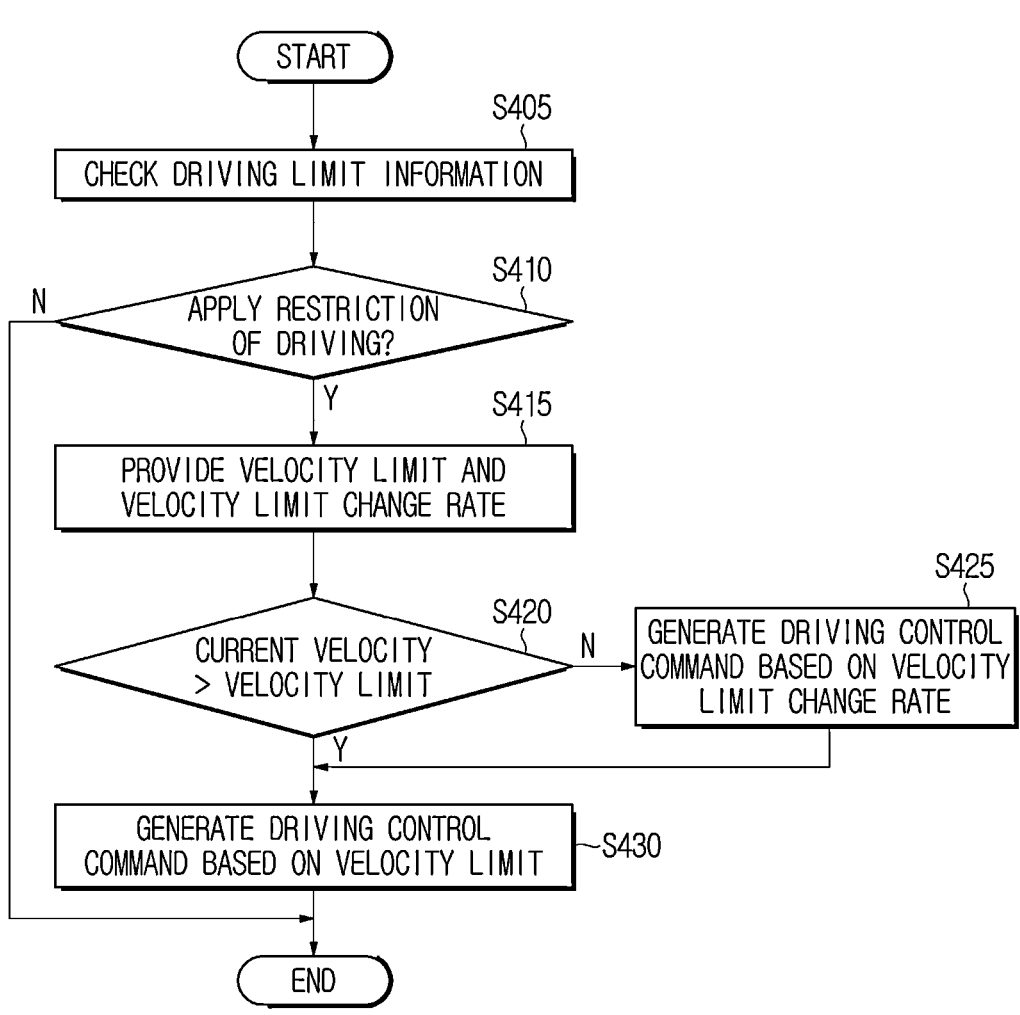

FIG. 8 is a flowchart of a process of setting driving control information.

Figure 9A:
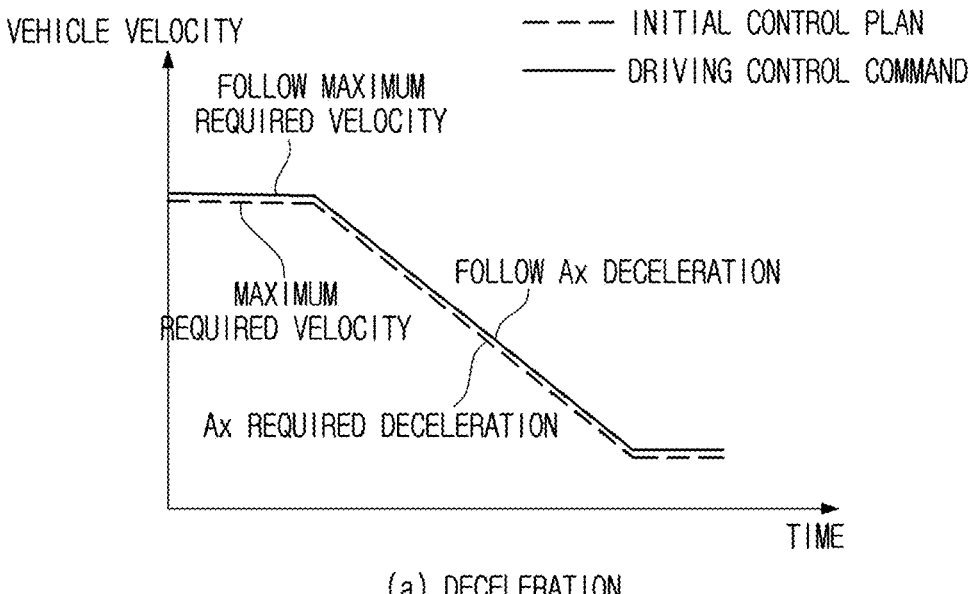
Figure 9B:
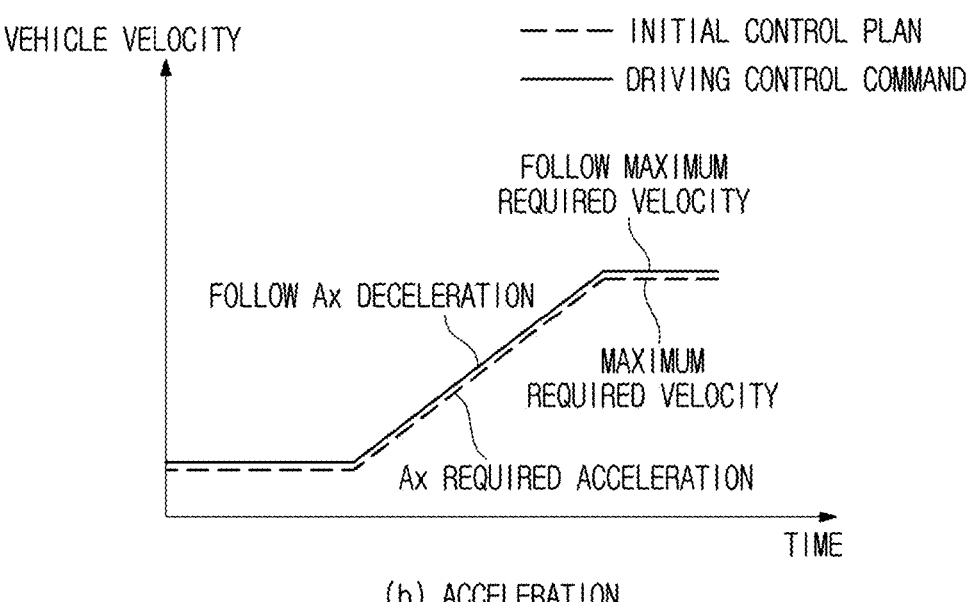

FIGS. 9A and 9B are views illustrating a driving plan of a driving control command according to autonomous driving.

Figure 10A:
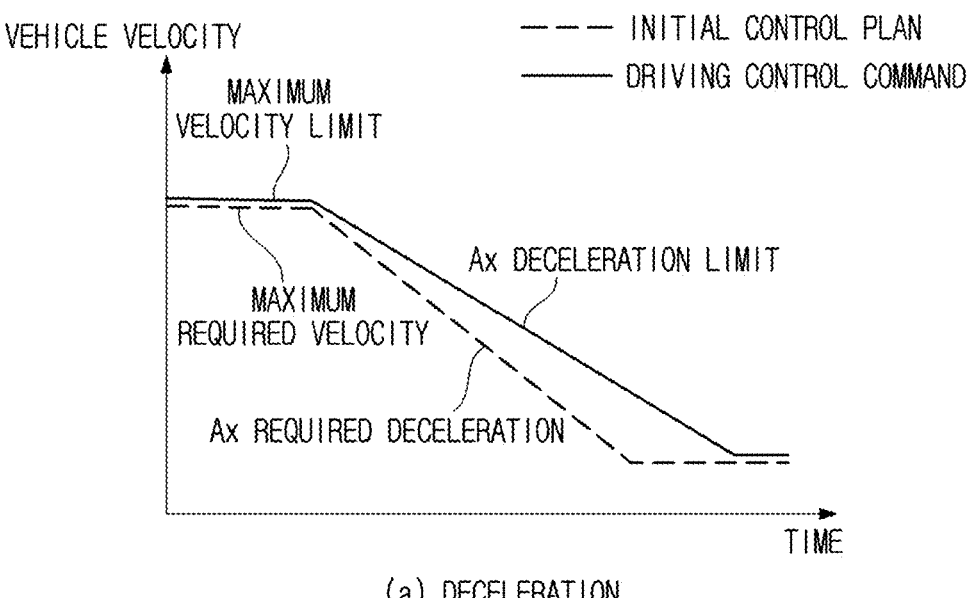
Figure 10B:
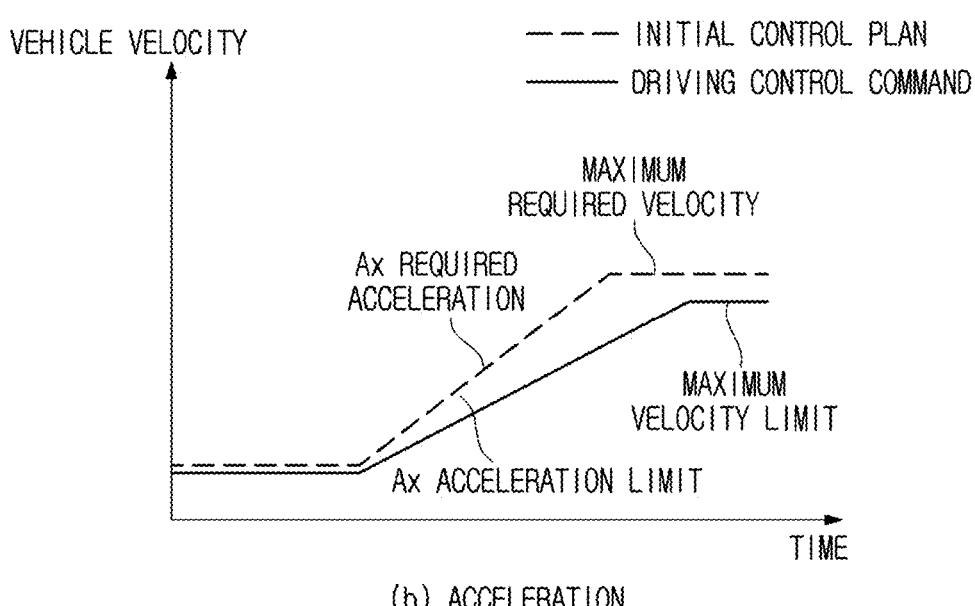

FIGS. 10A and 10B are views showing examples of a driving plan of a driving control command based on congestion information.

Figure 11A:
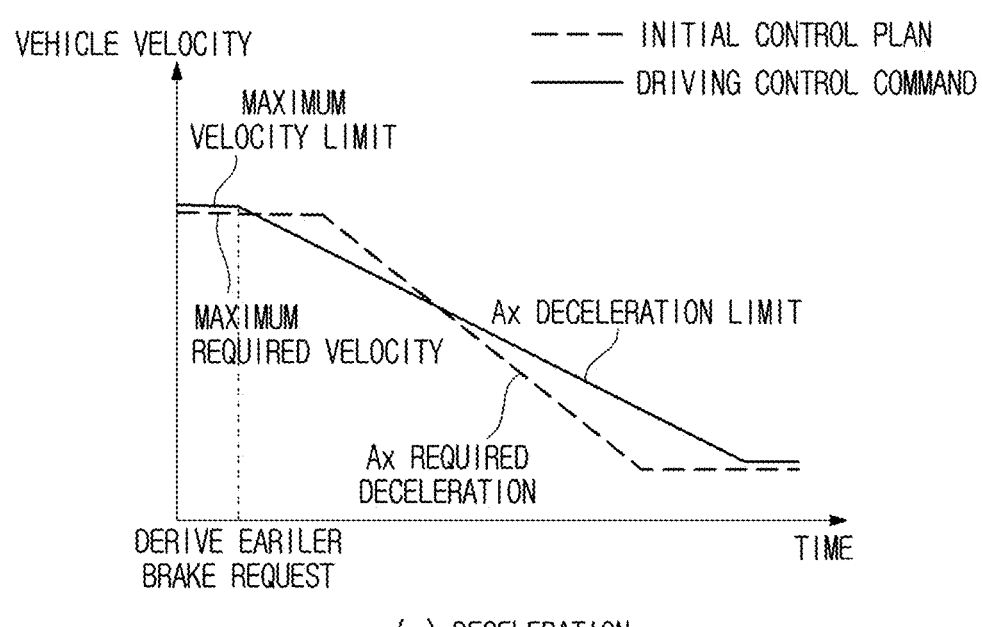
Figure 11B:
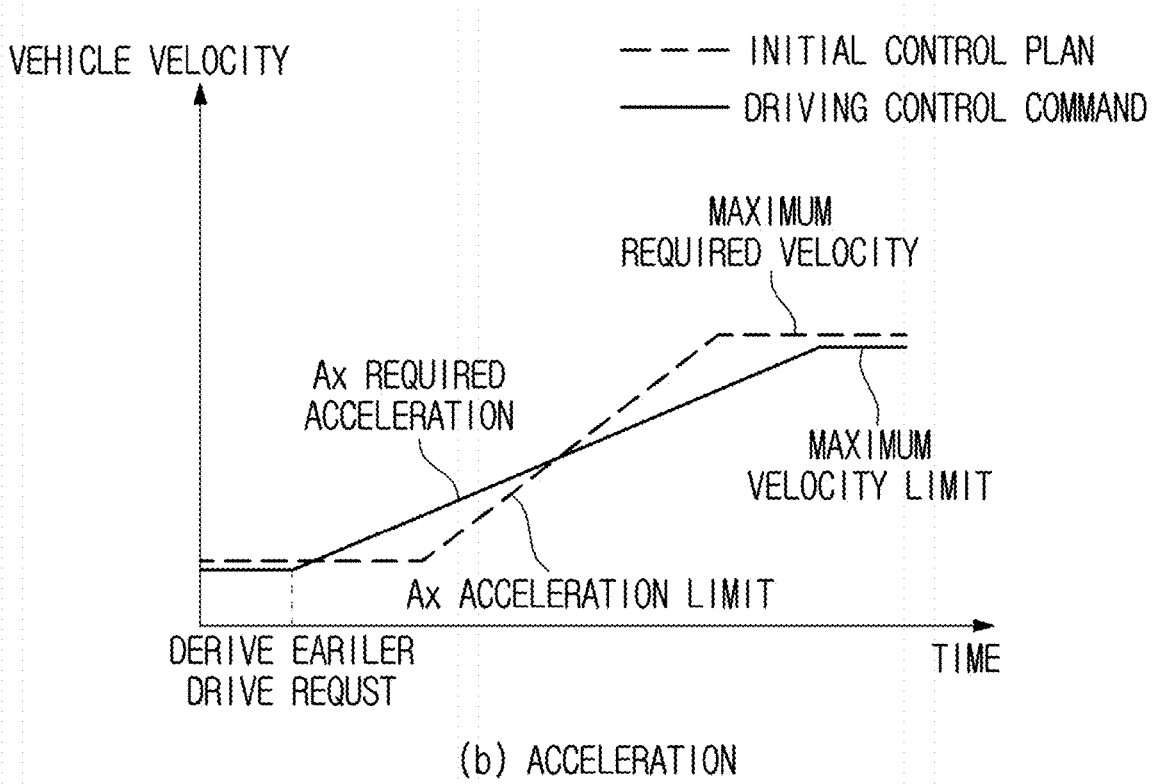

FIGS. 11A and 11B are views showing other examples of a driving plan of a driving control command based on congestion information.

DETAILED DESCRIPTION

Hereinafter, embodiments of the present disclosure are described in detail with reference to the accompanying drawings so that those having ordinary skill in the art may easily implement the present disclosure. However, the present disclosure may be implemented in various different ways and is not limited to embodiments described therein.

In describing embodiments of the present disclosure, well-known functions or constructions are not described in detail since they may unnecessarily obscure the understanding of the present disclosure. The same constituent elements in the drawings are denoted by the same reference numerals, and repeated descriptions of the same elements have been omitted.

In the present disclosure, when an element is simply referred to as being "connected to", "coupled to", or "linked to" another element, this may mean that an element is "directly connected to", "directly coupled to", or "directly linked to" another element or is connected to, coupled to, or linked to another element with the other element intervening therebetween. In addition, when an element "includes", "comprises", or "has" another element, this means that one element may further include another element without excluding another component unless specifically stated otherwise.

In the present disclosure, the terms first, second, and the like, are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. In other words, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean the elements are essential elements, and some of the elements may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present disclosure and the way of attaining them should become apparent with reference to embodiments described below in detail in conjunction with the accompanying drawings. Embodiments, however, may be embodied in many different forms and should not be constructed as being limited to the example embodiments set forth herein. Rather, these embodiments are provided so that this disclosure is complete and fully conveys the scope of the disclosure to those having ordinary skill in the art.

In the present disclosure, each of the phrases such as "A or B", "at least one of A and B", "at least one of A or B", "A, B or C", "at least one of A, B and C", ""at least one of A, B or C", and "at least one of A, B, C or combination thereof" may include any one item or all possible combinations of the items listed together in the corresponding one of the phrases.

Hereinafter, embodiments of the present disclosure are described with reference to the accompanying drawings. When a component, device, element, or the like, of the present disclosure, is described as having a purpose or performing an operation, function, or the like, the component, device, or element should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, referring to FIG. 1 and FIG. 2, a vehicle implementing driving control based on boarding congestion according to one embodiment of the present disclosure is described. FIG. 1 is a view illustrating a vehicle transmitting and receiving data in communication with another device.

Referring to FIG. 1, a vehicle 100 may be driven based on electric energy or fossil fuel energy. In the case of electric energy, the vehicle 100 may be a pure battery-based vehicle driven only by a high-voltage battery, for example, or may employ a gas-based fuel cell as an energy source. In the case of a fuel cell, the vehicle 100 may charge the high-voltage battery by electricity generation of the fuel cell and perform various functions required by modules of the vehicle 100 using output power of the high-voltage battery. In addition, the fuel cell may use various types of gases capable of generating electric energy, and hydrogen may be one example of the gases. However, without being limited thereto, various gases may be applied.

In the case of fossil fuel energy, the vehicle 100 may be driven based on fuels such as gasoline, diesel, or liquefied gas and may be equipped with an engine driving a wheel unit 110 by combustion of the fuels. The engine may be included in a driving force generation unit 108 from the perspective of providing driving torque of wheels to the wheel unit 110.

For convenience of explanation, in the present disclosure, an electric energy vehicle is described as an example of the fuel cell-based vehicle 100. However, the present disclosure is applicable to any vehicle that has heterogeneous types of a high-voltage battery and a cell and that employs a method of charging the high-voltage battery outputting power for the ignition and driving of the vehicle 100 and a load device 120 by electricity generated by the cell.

The vehicle 100 may refer to a device capable of moving. The vehicle 100 may be a ground vehicle driving on the ground and be a typical passenger vehicle or commercial vehicle, a moving office, or a moving hotel. The vehicle 100 may be a four-wheeled vehicle, for example, a car, a sports utility vehicle (SUV), or a small truck, or may be a vehicle with more than four wheels, for example, a bus, a large truck, a container truck, a heavy vehicle, or the like. The vehicle 100 may be implemented by manual operation or autonomous driving (including semi-autonomous and full-autonomous driving). In the present disclosure, the vehicle 100 is a multi-passenger vehicle that multiple passengers may board and then sit in seats or stand up and is described to be controlled, for example, by autonomous driving.

The vehicle 100 may communicate with another device 200 or another vehicle 300 under the control of a communication control unit (CTU) mounted on the vehicle 100. For example, another device 200 may include a server 200 supporting various controls, state management, and driving of the vehicle 100, an intelligent transportation system (ITS) device for receiving information from an ITS, and various types of user devices.

The vehicle 100 may communicate with another vehicle or another device based on cellular communication, wireless access in vehicular environment (WAVE) communication, dedicated short-range communication (DSRC) or short-range communication, or other communication schemes.

For example, for communication with the server 200 and another vehicle 300, the vehicle 100 may use long term evolution (LTE) as a cellular communication network, a communication network such as 5G, a WiFi communication network, a WAVE communication network, or the like. As another example, DSRC and the like used in the vehicle 100 may also be used for communication between vehicles. A communication scheme among the vehicle 100, the server 200, another vehicle 300, and a user device is not limited to the above-described embodiment.

To support autonomous driving of the vehicle 100 and various services, the server 200 may transmit various information and a software module used for controlling the vehicle 100 to the vehicle 100 in response to a request and data transmitted from the vehicle 100 and a user device.

FIG. 2 is a view showing a module constituting the vehicle according to one embodiment of the present disclosure.

The vehicle 100 may include a battery 102, a fuel cell 104, and actuating units 108 and 110.

The battery 102 may be charged by electricity generation of the fuel cell 104 and supply power necessary for a module of the vehicle 100. The battery 102 may be a high-voltage battery composed of secondary cells. For example, the battery 102 may supply energy for the ignition and driving of the vehicle 100 and an operation of the load device 120. Specifically, the battery 102 may supply energy applied from the fuel cell 104 to ignition, driving, air-conditioning, and various electric devices of the vehicle 100. The battery 102 outputs a higher voltage than the fuel cell 104 and may supply energy, for example, to the driving force generation unit 108, a high-voltage electric module, and the like.

The fuel cell 104 may include a hydrogen fuel cell that generates electric energy through reaction between hydrogen supplied from a tank 106 and oxygen coming from outside. In addition, the fuel cell 104 may generate a generation quantity determined based on power required for ignition and driving and the load device 120 and may charge the battery 102 with the generated power. In addition, according to a design specification, the fuel cell 104 may supply energy to a low-power electric module mounted in the vehicle 100.

Hereinafter, for convenience of explanation, the battery 102 and the fuel cell 104 are described as examples, but the present disclosure may also be applied to the vehicle 100 operated only by the battery 102 charged by an external device, except in the case of regenerative braking, without having a cell like the fuel cell 104 mounted in the vehicle 100 for charging the battery 102.

Although not shown, a converter is a module functioning as a step-up/step-down transformer and may charge the battery 102 by converting and supplying a voltage from the fuel cell 104 to the battery 102. Depending on an operating situation, the converter may supply power at a converted voltage to the driving force generation unit 108 operated in a high-voltage range and various electronic devices. For example, the load device 120 may be one of the electronic devices.

The actuating units 108 and 110 may be equipped with at least one module implementing a driving operation and operate at least one driving operation such as a driving force, a braking force, and steering. The actuating units 108 and 110 may include, for example, the driving force generation unit 108 and the wheel unit 110.

When the vehicle 100 is based on electric energy, the driving force generation unit 108 may be equipped with a motor unit, a component for a brake system, a component for steering, and the like. For a fossil fuel-powered vehicle 100, the driving force generation unit 108 may be equipped with an internal combustion engine instead of a motor unit. In the present disclosure, the vehicle 100 may be electric, and a motor unit is described as an example module generating a driving force in the driving force generation unit 108.

The driving force generation unit 108 may have a motor unit receiving power from the battery 102 and driving wheels. For example, the driving wheels of the wheel unit 110 may all be connected to the motor unit and be driven. As another example, only some of the wheels of the wheel unit 110 may be connected to the motor unit, and other wheels of the wheel unit 110 not connected to the motor unit may be driven by the wheel unit driven by the motor.

The motor unit may receive power from the battery 102 to generate a driving force. The motor unit may deliver the driving force to the wheel unit 110, and the wheel unit 110 may be rotationally driven. For example, the motor unit may be equipped with a motor delivering a driving force and a motor control module controlling motor torque, a motor rotation direction, braking, and the like. The motor unit may be driven by receiving power applied from the battery 102 via an inverter (not shown). The inverter may convert a specific form of power of the battery 102, for example, alternating current, into another form, for example, direct current, and reduce a voltage. The inverter may convert a predetermined form of reverse power of the motor unit caused by regenerative braking into an appropriate form for the battery 102 and provide it to the battery 102.

The wheel unit 110 may be equipped with wheels, a wheel brake module, and a wheel steering module. The wheel brake module may be a module that delivers a braking force at a deceleration control request of a processor 124 to the wheels and decelerates the wheels. The wheel steering module may receive a mechanical operation generated by a component for steering in the driving force generation unit 108 in response to a turn request of the processor 124 and operate the wheels to turn at a predetermined angle.

The vehicle 100 may include the sensor unit 114, a transceiver 116, a display 118, the load device 120, a memory 122, and the processor 124.

The sensor unit 114 may be equipped with various types of detectors for detecting various states and situations occurring to the internal and external environments of the vehicle 100. In addition, the sensor unit 114 may be equipped with a sensor module used to generate congestion information associated with a boarding congestion level. The sensor module may include a counter used to estimate the number of boarding passengers and a module recognizing a sitting state, a weight, and the like of a passenger.

Specifically, the sensor unit 114 may be equipped with a location sensor 114*a*, a weight sensor 114*b*, a speedometer 114*c*, a board/unboard counting sensor 114*d*, a seat sensor 114*e*, and an image sensor 114*f*.

The location sensor 114*a* may measure a two-dimensional location and an altitude of the vehicle 100 during driving to detect a location of the vehicle 100. For example, the location sensor 114*a* may be a global positioning system (GPS) sensor, and the GPS sensor may measure positioning of the vehicle 100 based on information transmitted from a plurality of satellites. The location sensor 114*a* is not limited to the GPS sensor and may be composed of a plurality of sensors combined by the GPS sensor and other sensors.

The weight sensor 114*b* may be a sensor measuring a boarding weight caused by a passenger boarding the vehicle 100 in real-time. For example, the weight sensor 114*b* may measure the boarding weight based on an amount of change in the tires constituting the wheels of the vehicle 100, a hydraulic cylinder absorbing a shock on the vehicle 100, and the like. As another example, the weight sensor 114*b* may include an acceleration sensor and a gyro sensor and estimate a boarding weight based on data detected from the acceleration sensor and the gyro sensor. The weight sensor 114*b* may identify a weight of all boarded passengers sitting in seats and all boarded passengers that are standing.

The speedometer 114*c* may measure a velocity according to a driving direction (i.e., a longitudinal direction of the vehicle 100) and be implemented by a wheel speed sensor, for example. The board/unboard counting sensor 114*d* may be installed in a boarding/unboarding area of the vehicle 100 and count the number of passengers boarding and unboarding the vehicle 100. For example, the board/unboard counting sensor 114*d* may be an infrared sensor, a card reader to be tagged for paying a fare according to boarding and unboarding, and the like. The seat sensor 114*e* may be installed inside or near a seat and identify whether or not a passenger is sitting in the seat. The seat sensor 114*e* may identify whether or not each seat is occupied, and a total number of passengers sitting in seats may be calculated by an output value of the seat sensor 114*e*. The image sensor 114*f* may be configured as a camera module capturing the inside and outside of the vehicle. The image sensor 114*f* capturing the inside of the vehicle captures a boarding space including boarding and/or boarded passengers, and an image thus captured may be transmitted to the processor 124.

Although not shown, the sensor unit 114 may include a light detecting and ranging (LIDAR) sensor, a radio detection and ranging (RADAR) sensor, a distance sensor, a gyro sensor detecting a posture and a direction of the vehicle 100, and the like. The present disclosure is described with the main focus only on sensors referenced for explaining embodiments but may further include a sensor detecting various situations not listed herein.

The transceiver 116 may support mutual communication with the server 200, the neighbor vehicle 300, roadside equipment, or a user device.

In the present disclosure, under the control of the communication control unit (CTU), the transceiver 116 may transmit data generated or stored during driving to the server 200 and receive data and a software module transmitted from the server 200. In the present disclosure, the vehicle 100 may transmit and receive data used in the method according to the present disclosure to and from the outside respectively through the transceiver 116.

The display 118 may function as a user interface. The display 118 may display an operation state of the vehicle 100, a control state, route/traffic information, a battery state, residual gas information, contents requested by a driver, and the like to be output by the processor 124. The display 118 may be configured as a touch screen capable of detecting an input of the driver and receive a request of the driver indicated to the processor 124.

The load device 120 is mounted in the vehicle 100 and may be an assistant device consuming power supplied from the battery 102 by the use of a passenger or a user. In the present disclosure, the load device 120 may be a type of a non-driving electric device excluding a driving operation system of the actuating units 108 and 110 and the like. For example, the load device 120 may be an air-conditioning system, a lighting system, a seat system, and various devices installed in the vehicle 100.

The memory 122 may store an application for controlling the vehicle 100 and various data and may load the application or read and record the data at a request of the processor 124. In the present disclosure, the memory 122 may construct driving limit information based on congestion information generated based on passenger number information of the vehicle 100 and driving state information and may store an application and at least one instruction for setting driving control information applied to the actuating units 108 and 110 based on the driving limit information.

To this end, the memory 122 may store and manage, for example, the driving restriction information according to a congestion level used for constructing the driving limit information. In addition, the memory 122 may manage a path set for autonomous driving, traffic information, weather information, a control plan applied to a path, and the like. The control plan may be a driving control parameter according to each path section established based on a path, the above-described information, a surrounding environment of the vehicle 100, and the like. For example, the driving control parameter may be a velocity, a velocity change rate, a turn angle, and the like.

The processor 124 may perform overall control of the vehicle 100. The processor 124 may be configured to execute an application and an instruction stored in the memory 122. Related to the present disclosure, the processor 124 may construct the driving limit information based on congestion information generated based on passenger number information of the vehicle 100 and driving state information by using an application, an instruction, and data stored in the memory 122. The processor may also control the vehicle 100 to execute processing of driving control information applied to the actuating units 108 and 110 based on the driving limit information.

As an example, the processing may be executed in at least a part of the processor 124 (i.e., at least one processing module) and at least a part of the memory 130.

As another example, the processing may be executed in a plurality of processing modules and a memory embedded in each module. The plurality of processing modules and the embedded memory may constitute the processor 124 and the memory 122 according to the present disclosure.

As an example, the plurality of processing modules may be composed of individual processing modules controlling each member of the vehicle 100 and a higher processing module managing the individual processing modules at a higher level.

The higher processing module managing all the above-described individual processing modules may be an electronic control unit (ECU) for integrated chassis control. Specifically, the ECU may support the functions of an autonomous driving control ECU, an acceleration ECU, and a deceleration ECU. According to the above description, the driving control based on a congestion level is executed through the ECU for integrated chassis control, but for convenience of explanation, in the present disclosure, the processor 124 including the processing modules is described to process the control. Although a detailed process for the above-describe processing is described with the focus on the processor 124, a processing module taking the detailed process may be clearly inferred from the above description. Accordingly, in the present disclosure, the processor means a conceptual controller including a single or a plurality of processing modules.

The above-described processing of the processor 124 is described in detail through FIGS. 3-11.

Referring to FIG. 3, a driving control method based on boarding congestion according to another embodiment of the present disclosure is described in detail. FIG. 3 is a flowchart of a driving control method based on boarding congestion according to another embodiment of the present disclosure. In the present disclosure, the vehicle 100 is described mainly as a means of transportation that is moving by autonomous driving and available by standing seats and sitting seats.

The processor 124 of the vehicle 100 may control an operation of the vehicle 100 based on a path and a control plan set by autonomous driving and generate passenger number information associated with passengers boarding the vehicle 100 during the operation (S105).

The vehicle 100 may be driven on a path designated by a user or according to a route. In addition, the vehicle 100 may execute autonomous driving based on a control plan applied to a forward path to be traveled from a current location. The control plan is established by the processor and may be generated based on path information associated with the forward path. For example, the path information may include a path, information indicating a state and a situation on the path, a state of the vehicle 100, and the like. For autonomous driving, the control plan may be established by referring to driving requirement information set according to each specific section on the path based on the path information. The information associated with the state and situation of the path may include road information including a speed limit and a turn radius (or curvature radius), traffic information including congestion, accidents, road construction, and the like, and weather information. For example, the state of the vehicle may include residual fuel amount, a maximum power output of the battery 102, a maximum power generation amount of the fuel cell 104, a drivable distance, power consumption of the load device 120, an operating state and a range of the actuating units 108 and 110, an operating state of other detailed modules in the vehicle 100, and the like.

The driving requirement information is a required driving value applied to a detailed section of the path for autonomous driving and may be, for example, a required velocity, a change rate of required velocity, a steering control value, and the like. The control plan may be a driving control command including a driving plan to be set on the forward path based on the driving requirement information. For example, the driving plan may be associated with a set velocity, a set velocity change rate, a steering set value, and the like. The driving control command may be used to generate a driving control plan including a control signal for a mechanical operation implemented in the actuating units 108 and 110. For example, the control signal may be a signal for generating driving torque of a motor unit, a braking force requested to a component for a brake system and/or a steering angle of a component for steering.

Passenger number information may include data about the number of passengers estimated based on an output value obtained from a specific module of the sensor unit 114. The passenger number information may be generated as illustrated in FIG. 4. FIG. 4 is a flowchart of a process of generating passenger number information.

First, the processor 124 may generate board/unboard count information, sitting count information, and image count information (S205).

The board/unboard count information may be data including the number of passengers boarding the vehicle 100 in real time based on the number of passengers boarding or unboarding counted through the board/unboard counting sensor 114d. The sitting count information may be data including the number of sitting passengers occupying seats in real time through the seat sensor 114e. The image count information may be data including the number of passengers in an image who is estimated to board the vehicle 100 in real time as identified in the image inside the vehicle 100. For example, the processor 124 may learn various shapes and characteristics of passengers recognized as passengers in an image of vehicle interior by machine learning, analyze an image and identify passengers through an algorithm thus learnt, and estimate the number of boarding passengers based on the identified passengers.

Next, the processor 124 may determine whether or not the number of boarding passengers in the board/unboard count information is greater than the number of sitting passengers in the sitting count information (S210). In the above determination, if the number of sitting passengers is greater, the processor 124 may adopt the sitting count information (S215), and if the number of boarding passengers is greater, the processor 124 may select the board/unboard count information (S220).

Next, the processor 124 may compare the number of passengers of a type (or information) selected at step S215 or S220 and the number of passengers in the image and determine whether or not the number of passengers in the image is greater than the number of passengers of the selected type (S225). In the above determination, if the number of passengers in the image is greater, the processor 124 may adopt the image count information as an estimated number of passengers (S230), and in the above determination, if the number of passengers of the selected type is greater, the processor 124 may select the count information of the selected type as the estimated number of passengers (S235). In other words, the processor 124 may determine data about a maximum number of passengers indicating a maximum estimated number of passengers among multiple pieces of data about an estimated number of passengers for estimating the number of boarding passengers (e.g., the board/unboard count information), the sitting count information, and the image count information, as an estimated number of passengers.

Next, the processor 124 may generate passenger number information including the number of boarding passengers in real time in the vehicle 100 by applying an adjustment factor according to a boarding weight to the estimated number of passengers described above (S240).

The above-determined estimated number of passengers may be the data about a maximum number of passengers adopted at step S230 or S235. The adjustment factor may be a weight correction factor that is determined according to a total weight of passengers boarded in the vehicle 100 (i.e., a boarding weight). The boarding weight may be measured by the weight sensor 114b. The weight correction factor may be a mapping value depending on a standard weight ratio according to a measured boarding weight. For example, the standard weight ratio may be calculated by ((measured boarding weight/standard weight)/number of boarded passengers)*100. Herein, a standard weight per person may be determined as 65 kg, which is the average weight of adults. Even when there are many boarded passengers, if passengers below the average weight occupy a considerable ratio, the standard weight ratio is calculated to be less than 100 so that the weight correction factor may be mapped to a value less than 1. In the above-described example, if passengers above the average weight occupy a considerable ratio, the standard weight ratio is calculated to greater than 100 so that the weight correction factor may be mapped to a value greater than 1.

When the weight correction factor is 1, the number of boarded passengers in the passenger number information may be determined as the estimated number of passengers determined above. When the weight correction factor is less than 1, the passenger number information may be determined as the number of boarded passengers less than the above estimated number of passengers according to the value of the weight correction factor. When the weight correction factor is greater than 1, the passenger number information may be determined as the number of boarded passengers greater than the above estimated number of passengers according to the value of the weight correction factor.

The adjustment factor according to the present disclosure is not limited to the above-described weight correction factor and may be determined in various ways.

Referring to FIG. 3 again, the processor 124 may generate congestion information based on the passenger number information of the vehicle (S110).

For example, the congestion information may be generated based on the number of boarded passengers in the passenger number information and a boarded area of the vehicle 100. Specifically, the congestion information may be a congestion level calculated based on the number of passengers per area that is confirmed to ensure the safety of passengers boarded in the vehicle 100 and standing, for example, on a bus, a subway train, and the like even from a predetermined motion of the vehicle 100. The safety may mean that there is no injury on the passengers caused by the predetermined motion or contact with other passengers or hindrance to movement is less than a reference value. The passengers may include both sitting passengers and standing passengers, or as another example, only standing passengers. The number of passengers per area is referred to as a congestion standard value, which may be, for example, 2.6 passengers/meter squared ($m^2$). The congestion information may be a congestion level that is calculated by dividing the product of the number of boarding passengers in passenger number information and a boarded area of the vehicle 100 by the congestion standard value. For example, the congestion information may be periodically generated or generated every time a boarding/unboarding event occurs but not be limited thereto and generated according to various schedules.

Next, the processor 124 may construct the driving limit information based on path information, driving state information, driving requirement information, and congestion information (S115).

The driving limit information may be generated to include specific information based on driving restriction information specified according to the path information, the driving state information and the congestion information. The specific information may include any one of the driving requirement information or the driving restriction information and also include a message for indicating whether or not there is a restriction to be applied. The message may notify whether or not the driving limit information is constructed as the driving restriction information.

As described above, the path information may include a path, road information, traffic information, weather information, a state of the vehicle 100, and the like. The driving state information may include a required velocity, a required velocity change rate, a steering control value, and the like, which are expected on a forward path according to the path information. The required velocity change rate is a required velocity change rate according to a longitudinal direction of the vehicle 100. The longitudinal direction may be a direction according to +x and –x parallel to a driving direction of the vehicle 100, as shown in FIG. 1. The required velocity change rate may include a required acceleration and a required deceleration.

For example, the driving restriction information may include a velocity limit and a velocity change rate limit that are specified according to a congestion level of the congestion information. The velocity change rate limit may have a velocity change rate limit of a longitudinal direction and a velocity change rate limit of a transverse direction. Like the required velocity change rate, the velocity change rate limit of the longitudinal direction is a change rate limit according to a direction parallel to a driving direction and may include an acceleration limit of the longitudinal direction and a deceleration limit of the longitudinal direction. The velocity change rate of the transverse direction is a velocity rate occurring by a turn of the vehicle 100 according to a curve of road and may be a change rate limit working on the vehicle 100 according to a direction of +y and –y illustrated in FIG. 1. The velocity change rate limit of the transverse direction may include an acceleration limit of the transverse direction and a deceleration limit of the transverse direction.

The driving restriction information is built up by a predetermined method, and the velocity change rate limit may be defined by the method illustrated in FIG. 5 and FIG. 6. FIG. 5 is a view illustrating limit mapping information of a velocity change rate according to congestion information. FIG. 6 is a view illustrating a linear graph of a longitudinal velocity change rate generated based on limit mapping information.

Referring to FIG. 5, a diagram for limit mapping information shows a correlation between accidents of boarding in standing seats accumulated in the same type of vehicles as the vehicle 100 and a velocity change rate. FIG. 5 illustrates a safety velocity change rate ensuring the safety of sitting or standing passengers according to each congestion level described at step S110. FIG. 5 is mapped with a discrete reference velocity change rate corresponding to a congestion level of a specific section, and the safety velocity change rate may be a velocity change rate ensuring a level at which no accident occurs to passengers, or a gentle shake causes no injury.

The diagram illustrated in FIG. 5 may underlie statistical data analyzed through a large amount of data related to an accident and a velocity change rate and a model built up based on the data. The model may be established based on statistical analysis related to passengers' behaviors according to a driving motion. Specifically, the model may be generated in consideration of a behavior of passengers responding more appropriately to deceleration according to a longitudinal direction than to acceleration according to the longitudinal direction and a turning motion according to a transverse direction. Accordingly, as each reference velocity change rate illustrated in FIG. 5 reflects the behavior, a permissible range of deceleration (–Ax) according to the longitudinal direction may be distributed wider than acceleration (+Ax) of the longitudinal direction. In addition, based on an analysis result of the data, the acceleration/deceleration range (+Ay, –Ay) of the transverse direction corresponding to turning motions is equal to or less than the longitudinal acceleration, and the absolute values of upper limit of acceleration and lower limit of deceleration according to the transverse direction may be set to be substantially identical.

In FIG. 5, congestion increases from the basic congestion level to the congestion level 3, and as congestion increases, a change range of a circle of the reference velocity change rate may be set to decrease. For example, the basic congestion level may be a congestion score of 80 or below and refer to a state in which most passengers are seated, and a standing area is spacious. The congestion level 1 exceeds the congestion score of 80 and may refer to a state in which some passengers are boarded and standing but moving in the standing area is hardly difficult. The congestion level 2 exceeds a congestion score of 130 and may mean a state in which moving in the standing area causes bumping between passengers. The congestion level 3 exceeds a congestion score of 150 and may refer to a state in which moving in the standing area is substantially impossible.

A discrete reference velocity change rate illustrated in FIG. 5 is defined only for a specific congestion level. A reference velocity change rate corresponding to another congestion level than a specific congestion level may not be clearly provided in FIG. 6. To obtain the reference velocity change rate of another congestion level, various inference techniques may be used. For example, by applying a linear interpolation method, a reference velocity change rate of a congestion level with no reference velocity change rate provided may be estimated. FIG. 7 shows an example in which a reference acceleration (+Ax) of the longitudinal direction among velocity change rates of the longitudinal direction is estimated as consecutive values by the linear interpolation method.

To further prevent a standing area accident, a velocity limit change rate may be generated by applying a specific value according to a safety factor to a reference velocity change rate. The velocity limit change rate may be derived by multiplying a value considering a safety factor, for example, an 80% safety rate as compared with the occurrence of an accident and the reference velocity change rate. FIG. 6 shows an example in which an acceleration limit of the longitudinal direction is derived by multiplying a reference acceleration of the longitudinal direction and the specific value.

FIG. 6 illustrates derivation of an acceleration limit of the longitudinal direction among velocity limit change rates. However, a deceleration limit of the longitudinal direction, a velocity limit of the transverse direction, and a deceleration limit of the transverse direction may also be derived in a similar way to the example of FIG. 6.

A detailed process of constructing driving limit information of step S115 is described with reference to FIG. 7.

First, the processor 124 may determine whether or not a driving velocity change rate is greater than a velocity limit change rate of the longitudinal direction specified by congestion information in terms of absolute value (S305).

The driving velocity change rate may be predicted based on driving state information and driving requirement information. The driving state information is a current velocity according to a driving direction of the vehicle 100. The driving requirement information may be a required velocity according to the driving direction applied to a forward path for autonomous driving. The current velocity may be measured by, for example, the speedometer 114c. The driving velocity change rate may be calculated as a change rate of the difference between a required velocity per unit time and the current velocity. The comparison in terms of absolute values may be attributable to the fact that the driving velocity change rate and the velocity limit change rate of the longitudinal direction are any one of acceleration (positive change rate) or deceleration (negative change rate) according to the driving direction.

When the absolute value of the driving velocity change rate is determined to be greater than the absolute value of the velocity limit change rate of the longitudinal direction, the processor may primarily set a first velocity, which is restricted to be lower than a required velocity by a velocity change rate based on the velocity limit change rate of the longitudinal direction and the change rate, as driving limit information (S310). The first velocity is referred to as a velocity limit of the longitudinal direction, and the velocity change rate at step S310 may be determined as, for example, the velocity limit change rate of the longitudinal direction.

On the other hand, when the driving velocity change rate is equal to or less than the velocity limit change rate in terms of absolute value, the processor 124 may maintain the required velocity set in the driving requirement information and primarily set the required velocity as the driving limit information (S315).

Next, the processor 124 may determine whether or not a turn velocity change rate is greater than a velocity limit change rate of the transverse direction specified by congestion information in terms of absolute value (S320).

For example, the turn velocity change rate may be calculated as a ratio of a turn radius (or curvature radius) of a forward path included in path information to a square value of a velocity according to the driving direction set through step S310 or S315 and be a velocity change rate predicted from a turning motion on the forward path. At a constant velocity, as the turn radius decreases, the turn velocity change rate increases, and if the forward path becomes similar to a straight road, the turn radius increases and the turn velocity change rate may increase. The comparison in terms of absolute values may be attributable to the fact that the turn velocity change rate and the velocity limit change rate of the transverse direction are any one of acceleration (positive change rate) or deceleration (negative change rate) according to the transverse direction.

When the absolute value of the turn velocity change rate is determined to be greater than the absolute value of the velocity limit change rate of the transverse direction, the processor 124 may finally set a second velocity, which is restricted to be lower than a velocity determined at step S310 or S315 by a velocity change rate based on the velocity limit change rate of the transverse direction and the change rate, as the driving limit information (S325). The second velocity is referred to as a velocity limit of the transverse direction, and the velocity change rate at step S325 may be determined as, for example, the velocity limit change rate of the transverse direction.

On the other hand, when the turn velocity change rate is equal to or less than the velocity limit change rate in terms of absolute value, the processor 124 may maintain and finally set the first velocity of step S310 or the required velocity of step S315 as the driving limit information. In addition, the processor 124 may maintain and finally set the turn velocity change rate based on a velocity set at step S310 or S315 as the driving limit information (S330). The first velocity of step S310 may be added to a velocity limit of the longitudinal direction and used as a velocity limit of the transverse direction. A turn velocity change rate according to the first velocity may be referred to as a velocity limit change rate of the transverse direction.

Next, the processor 124 may configure the velocity and the velocity change rate, which are finally set at step S305 and step S330, as a permissible velocity and a permissible velocity change rate, respectively, and generate a message for indicating whether or not a restriction of at least one of step S310 and step S325 is applied. The processor 124 may generate the driving limit information including the permissible velocity, the permissible velocity change rate, and the message regarding whether or not the restriction is applied (S340).

Specifically, when the velocity limit and the velocity limit change rate are adopted based on congestion information in at least one of step S310 and step S325, the velocity limit and the velocity limit change rate may be configured as the permissible velocity and the permissible velocity change rate, respectively. If the required velocity of the driving requirement information set at step S315 is maintained, the required velocity and a corresponding required velocity change rate may be configured as the permissible velocity and the permissible velocity change rate, respectively. If the permissible velocity and the permissible velocity change rate adopt a velocity limit and a velocity limit change rate, a message may be recorded that there is no restriction applied. On the other hand, if the permissible velocity and the permissible velocity change rate adopt a required velocity and a required velocity change rate, a message that there is no restriction applied may be generated. In other words, the message may notify whether or not the permissible velocity and the permissible velocity change rate are set by restricting the driving requirement information based on the congestion information.

Referring to FIG. 3 again, the processor 124 may set driving control information to be applied to the actuating units 108 and 110 of the vehicle 100 based on the driving state information and the driving limit information (S120). A detailed process of step S120 is described with reference to FIG. 8. FIG. 8 is a flowchart of a process of setting driving control information.

First, the processor 124 may check driving limit information applied to a forward path before entering the path according to autonomous driving (S405). For example, the driving limit information may be stored and managed in the memory 122.

Next, the processor 124 may check whether or not there is a restriction to be applied, by reading a message of the driving limit information (S410).

If there is no restriction to be applied (N of S410), the processor 124 may identify a required velocity and a required velocity change rate included in the driving limit information and establish a set velocity and a set velocity change rate to be applied to a forward path based on the required velocity and the required velocity change rate. The processor 124 may generate a driving control command including the set velocity and the set velocity change rate. Before entering the path or at an initial stage of the entry, the processor 124 may generate driving control information with an operation plan of at least one of driving, braking, or steering of the actuating units 108 and 110 according to the driving control command.

FIGS. 9A and 9B are views illustrating a driving plan of a driving control command according to autonomous driving. FIGS. 9A and 9B illustrate driving plans of a driving control command corresponding to a case in which driving limit information is constructed as driving requirement information to be expected for autonomous driving without restriction to be applied. FIGS. 9A and 9B show driving plans associated with a velocity and a velocity change rate of the longitudinal direction. An initial control plan may be established in relation to driving requirement information for autonomous driving (i.e., a required velocity plan and a required velocity change rate). The driving control command may be generated based on the initial control plan (i.e., following a maximum required velocity), a required deceleration, and a required acceleration of the initial control plan, and an operation plan corresponding to the initial control plan may be established.

If there is a restriction to be applied (Y of S410), the processor 124 may receive and identify a velocity limit and a velocity limit change rate in the driving limit information from the memory 122 (S415).

Next, the processor 124 may compare a current velocity, which is a type of the driving state information of the vehicle 100, and a velocity limit that is a type of the driving limit information and may determine whether or not the current velocity is higher than the velocity limit (S420).

If the current velocity is equal to or lower than the velocity limit, the processor 124 may generate the driving control command based on the velocity limit change rate (S425).

The driving control command may be generated to have a driving plan that is controlled as a velocity limit change rate maintaining the current velocity equal to or lower than the velocity limit or as a velocity limit change rate for accelerating or decelerating from the current velocity. In an acceleration situation, a driving ECU in the processor 124 may set a velocity change rate required for acceleration from the current velocity based on, for example, an acceleration limit of the longitudinal direction and the transverse direction. The driving control command may include a driving operation plan of the actuating units 108 and 110 for control at the set velocity change rate. The driving control command may include a control signal transmitted to the actuating units 108 and 110 for implementing the driving operation plan. In a deceleration situation, a braking ECU in the processor 124 may set a velocity change rate required for deceleration from the current velocity based on, for example, a deceleration limit of the longitudinal direction and the transverse direction. The driving control command may include a braking operation plan of the actuating units 108 and 110 for control at the set velocity change rate. The driving control command may include a control signal transmitted to the actuating units 108 and 110 for implementing the braking operation plan.

Generation of a driving control command implemented at step S425 is described through the examples of FIGS. 10A-11B. FIGS. 10A, 10B, 11A, and 11B illustrate generation of a driving control plan corresponding to a case in which a driving plan according to driving limit information is different from an initial control plan on a forward path according to driving requirement information. FIGS. 10A and 10B are views showing examples of a driving plan of a driving control command based on congestion information. FIGS. 11A and 11B are views showing other examples of a driving plan of a driving control command based on congestion information. In addition, FIGS. 10A-11B show a driving plan associated with a velocity and a velocity change rate of the longitudinal direction.

As shown in FIG. 10A, a permissible velocity change rate of driving limit information (i.e., a deceleration limit of the longitudinal direction) is set to be lower than a required deceleration of an initial control plan in terms of absolute values, when the vehicle 100 is decelerated below a current velocity according to a situation of a forward path. The processor 124 may set a set velocity change rate based on the deceleration limit of the longitudinal direction instead of the required deceleration. A driving control command may include a braking operation plan of the actuating units 108 and 110 for control at the set velocity change rate.

As shown in FIG. 10B, a permissible velocity change rate of the driving limit information (i.e., an acceleration limit of the longitudinal direction) is set to be lower than a required acceleration of the initial control plan, when the vehicle 100 is accelerated above the current velocity according to a situation of a forward path. The processor 124 may set a set velocity change rate based on the acceleration limit of the longitudinal direction instead of the required acceleration. A driving control command may include a driving operation plan of the actuating units 108 and 110 for control at the set velocity change rate.

As shown in FIG. 11A, according to a situation of a forward path, when the vehicle 100 is decelerated below a current velocity within a range of a predetermined time or distance, when the processor 124 starts deceleration control according to a deceleration limit of the longitudinal direction at a deceleration start point (deceleration start time) of an initial control plan, the processor 124 may determine whether or not deceleration to a desired velocity is possible. If deceleration is possible, as shown in FIG. 10A, the processor 124 may generate a driving control command controlled as a deceleration limit of the longitudinal direction at the deceleration start point of the initial control plan. On the other hand, if deceleration by deceleration control starting at the deceleration start point is impossible, as shown in FIG. 11A, the processor 124 may generate a driving control command controlled as a deceleration limit of the longitudinal direction ahead of the deceleration start point of the initial control plan. Generation of other driving control commands is substantially the same as FIG. 10A.

As shown in FIG. 11B, according to a situation of a forward path, when the vehicle 100 is accelerated above a current velocity within a range of a predetermined time or distance, when the processor 124 starts acceleration control according to an acceleration limit of the longitudinal direction at an acceleration start point (acceleration start time) of an initial control plan, the processor 124 may determine whether or not acceleration to a desired velocity is possible. If acceleration is possible, as shown in FIG. 10B, the processor 124 may generate a driving control command controlled as an acceleration limit of the longitudinal direction at the acceleration start point of the initial control plan. On the other hand, if acceleration by acceleration control starting at the acceleration start point is impossible, as shown in FIG. 11B, the processor 124 may generate a driving control command controlled as an acceleration limit of the longitudinal direction ahead of the acceleration start point of the initial control plan. Generation of other driving control commands is substantially the same as FIG. 10B.

If the current velocity is higher than the velocity limit, the processor 124 may generate a driving control command based on the velocity limit (S430). The driving control command may be established to have a driving plan that the current velocity is decelerated to the velocity limit and is controlled at a velocity limit change rate. For example, the driving ECU in the processor 124 may set motor torque to 0 and also set a deceleration limit required for braking control. In addition, when a forward path is a curved road, the driving control command may be configured to have control at a velocity limit change rate of the transverse direction. An operation plan of the actuating units 108 and 110 associated with motor torque of 0 and braking for velocity limit change rates of the longitudinal direction and the transverse direction may be constructed as the driving control command. The driving control command may include a control signal transmitted to the actuating units 108 and 110 for implementing the operation plan.

Referring to FIG. 3 again, the processor 124 may process a driving operation to control the driving, braking, and steering of the actuating units 108 and 110 based on the operation plan of the driving control information generated in FIG. 9 (S125).

According to the present disclosure, it is possible to provide a driving control method based on boarding congestion for minimizing the disturbance of a driving motion endangering passengers and securing stable ride comfort and safety and to provide a vehicle using the method.

Effects obtained in the present disclosure are not limited to the above-mentioned effects. Other effects not mentioned above may be more clearly understood by those having ordinary skill in the art from the above description.

While methods of the present disclosure described above are represented as a series of operations for clarity of description, it is not intended to limit the order in which the steps are performed, and the steps may be performed simultaneously or in different order as necessary. In order to implement the methods according to the present disclosure, the described steps may further include other steps, remaining steps except for some of the steps, or other additional steps except for some of the steps.

The various embodiments of the present disclosure are not a list of all possible combinations but are intended to describe representative aspects of the present disclosure. The subject matter described in the various embodiments may be applied independently or in any combination.

In addition, various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, and the like.

The scope of the disclosure includes software or machine-executable commands (e.g., an operating system, an application, firmware, a program, and the like) for enabling operations according to the methods of various embodiments to be executed on an apparatus or a computer, a non-transitory computer-readable medium having such software or commands stored thereon and executable on the apparatus or the computer.

What is claimed is:

1. A driving control method based on boarding congestion, the method comprising:

generating congestion information based on passenger number information of a vehicle;

constructing driving limit information based on the congestion information and driving state information; and setting driving control information applied to operating the vehicle based on the driving limit information, wherein the vehicle is controlled using autonomous driving set by driving requirement information, the driving requirement information includes a required velocity and a required velocity change rate expected on a forward path of the vehicle, the driving state information is a current velocity on the path, the driving limit information is generated based on the congestion information, the driving requirement information, and the driving state information, the driving limit information includes a message for indicating i) whether or not a restriction is applied, ii) a permissible velocity, and iii) a permissible velocity change rate, the message indicates whether or not the permissible velocity and the permissible velocity change rate are set by restricting the driving requirement information by the congestion information, wherein the driving control information has a driving operation plan of at least one of driving, braking, or steering for the actuating according to a driving control command including a driving plan related to a set velocity and a set velocity change rate established on the forward path based on the driving limit information, and wherein the vehicle is controlled using autonomous driving established by driving requirement information, and wherein the driving control command includes a driving plan that the set velocity change rate is applied to driving of the vehicle before entry into the forward path to implement the set velocity change rate on the forward path when the driving plan according to the driving limit information is different from an initial control plan on the forward path according to the driving requirement information.

2. The method of claim 1, wherein the vehicle is configured to accommodate sitting or standing passengers, and wherein the passenger number information is generated based on maximum passenger number data among multiple pieces of estimated passenger number data estimating a number of passengers in the vehicle.

3. The method of claim 2, wherein the passenger number data includes:

board/unboard count information indicating a number of passengers boarding the vehicle based on counts of boarding/unboarding passengers;

sitting count information indicating a number of sitting passengers; and image count information indicating a number of boarded passengers identified in an image inside the vehicle.

4. The method of claim 2, wherein the passenger number information is generated by applying an adjustment factor according to a boarding weight to the maximum passenger number data.

5. The method of claim 1, wherein the congestion information is generated as a congestion level based on the number of boarding passengers in the passenger number information and a boarded area of the vehicle.

6. The method of claim 1, wherein the permissible velocity and the permissible velocity change rate are determined based on a velocity limit and a rate of change of the velocity limit over time, respectively, when an absolute value of a driving velocity change rate or an absolute value of a turn velocity change rate, which are predicted based on the driving state information and the driving requirement information, exceeds an absolute value of a respective velocity limit change rate defined by the congestion information, and the permissible velocity and the permissible velocity change rate are determined based on the driving requirement information, when the absolute value of the driving velocity change rate or the absolute value of the turn velocity change rate are equal to or less than the absolute value of the respective velocity limit change rate.

7. The method of claim 6, wherein the respective velocity limit change rate is a velocity limit change rate of a longitudinal direction and a velocity limit change rate of a transverse direction that are set by the congestion information, the driving velocity change rate and the velocity limit change rate of the longitudinal direction are velocity rates according to a driving direction of the vehicle, and the turn velocity change rate and the velocity limit change rate of the transverse direction are velocity rates occurring during a turn of the vehicle along a curve of the forward path.

8. A vehicle implementing driving control based on boarding congestion, the vehicle comprising:

an actuating unit generating a driving operation;

a memory storing at least one instruction for the vehicle; and a processor executing the at least one instruction stored in the memory, wherein the processor is configured to generate congestion information based on passenger number information of the vehicle, construct driving limit information based on the congestion information and driving state information, and set driving control information applied to the actuating unit based on the driving limit information, wherein the vehicle is controlled using autonomous driving set by driving requirement information, the driving requirement information includes a required velocity and a required velocity change rate expected on a forward path of the vehicle, the driving state information is a current velocity on the path, the driving limit information is generated based on the congestion information, the driving requirement information, and the driving state information, the driving limit information includes a message for indicating i) whether or not a restriction is applied, ii) a permissible velocity, and iii) a permissible velocity change rate, and the message indicates whether or not the permissible velocity and the permissible velocity change rate are set by restricting the driving requirement information by the congestion information, wherein the driving control information has a driving operation plan for the actuating unit according to a driving control command including a driving plan related to a set velocity and a set velocity change rate established on the forward path based on the driving limit information, and wherein the vehicle is controlled using autonomous driving established by driving requirement information, and wherein the driving control command includes a driving plan that the set velocity change rate is applied to driving of the vehicle before entry into the forward path to implement the set velocity change rate on the forward path when the driving plan according to the driving limit information is different from an initial control plan on the forward path according to the driving requirement information.

9. The vehicle of claim 8, wherein the vehicle is configured to accommodate sitting or standing passengers, and wherein the passenger number information is generated based on maximum passenger number data among multiple pieces of estimated passenger number data estimating a number of passengers in the vehicle.

10. The vehicle of claim 9, wherein the estimated passenger number data includes:

board/unboard count information indicating a number of passengers boarding the vehicle based on counts of boarding/unboarding passengers;

sitting count information indicating a number of sitting passengers; and image count information indicating a number of boarded passengers identified in an image inside the vehicle.

11. The vehicle of claim 9, wherein the passenger number information is generated by applying an adjustment factor according to a boarding weight to the maximum passenger number data.

12. The vehicle of claim 8, wherein the congestion information is generated as a congestion level based on the number of boarding passengers in the passenger number information and a boarded area of the vehicle.

13. The vehicle of claim 8, wherein the permissible velocity and the permissible velocity change rate are determined based on a velocity limit and a rate of change of the velocity limit over time, respectively, when an absolute value of a driving velocity change rate or an absolute value of a turn velocity change rate, which are predicted based on the driving state information and the driving requirement information, exceeds an absolute value of a respective velocity limit change rate defined by the congestion information, and the permissible velocity and the permissible velocity change rate are determined based on the driving requirement information, when the absolute value of the driving velocity change rate or the absolute value of the turn velocity change rate are equal to or less than the absolute value of the respective velocity limit change rate.

14. The vehicle of claim 13, wherein the respective velocity limit change rate is a velocity limit change rate of a longitudinal direction and a velocity limit change rate of a transverse direction that are set by the congestion information, the driving velocity change rate and the velocity limit change rate of the longitudinal direction are velocity rates according to a driving direction of the vehicle, and the turn velocity change rate and the velocity limit change rate of the transverse direction are velocity rates occurring during a turn of the vehicle along a curve of the forward path.

\* \* \* \* \*